United States Patent
Nelson

(10) Patent No.: US 9,178,357 B2
(45) Date of Patent: Nov. 3, 2015

(54) POWER GENERATION AND LOW FREQUENCY ALTERNATING CURRENT TRANSMISSION SYSTEM

(75) Inventor: Robert J. Nelson, Orlando, FL (US)

(73) Assignee: Siemens Aktiengesellschaft, München (DE)

( * ) Notice: Subject to any disclaimer, the term of this patent is extended or adjusted under 35 U.S.C. 154(b) by 659 days.

(21) Appl. No.: 13/527,690

(22) Filed: Jun. 20, 2012

(65) Prior Publication Data

US 2013/0343111 A1 Dec. 26, 2013

(51) Int. Cl.
*H02M 5/16* (2006.01)
*H02J 3/40* (2006.01)

(52) U.S. Cl.
CPC . *H02J 3/40* (2013.01); *Y02E 10/763* (2013.01)

(58) Field of Classification Search
USPC ............... 363/114–127, 170–172; 290/44.55; 700/286, 287, 291, 297
See application file for complete search history.

(56) References Cited

U.S. PATENT DOCUMENTS

| | | | | |
|---|---|---|---|---|
| 2,650,305 | A * | 8/1953 | Toulon | 331/173 |
| 4,104,715 | A * | 8/1978 | Lawson, Jr. | 363/37 |
| 4,719,550 | A * | 1/1988 | Powell et al. | 363/37 |
| 5,905,371 | A * | 5/1999 | Limpaecher | 323/288 |
| 6,466,468 | B1 * | 10/2002 | York | 363/65 |
| 6,741,485 | B1 * | 5/2004 | Runkle et al. | 363/170 |
| 7,851,943 | B2 | 12/2010 | Datta et al. | |
| 8,217,533 | B2 * | 7/2012 | Jones et al. | 307/82 |
| 8,219,256 | B2 * | 7/2012 | Nelson et al. | 700/287 |
| 8,301,311 | B2 * | 10/2012 | Nelson | 700/287 |
| 2009/0159677 | A1 * | 6/2009 | Yakimov et al. | 235/439 |
| 2009/0224607 | A1 | 9/2009 | Kjaer et al. | |
| 2010/0014325 | A1 * | 1/2010 | Raju et al. | 363/37 |
| 2010/0133901 | A1 | 6/2010 | Zhang et al. | |
| 2011/0001318 | A1 * | 1/2011 | Nelson | 290/44 |
| 2012/0001482 | A1 | 1/2012 | Burdick | |
| 2012/0299305 | A1 * | 11/2012 | Brogan et al. | 290/55 |
| 2013/0119950 | A1 * | 5/2013 | Nelson | 323/210 |

FOREIGN PATENT DOCUMENTS

WO 2012073228 A1 6/2012

OTHER PUBLICATIONS

Nan Qin et al; "Offshore wind farm connection with low frequency AC transmission technology"; Power & Energy Society General Meeting PES 09. IEEE; pp. 1-8; ISBN: 978-1-4244-4241-6; XP031538246.

(Continued)

*Primary Examiner* — Matthew Nguyen
*Assistant Examiner* — Nusrat Quddus

(57) ABSTRACT

A power generation and transmission system, including: a wind turbine having an electrical generator (12) producing AC electrical power at a production frequency; a converter connected to the electrical generator (12) and configured to convert the AC electrical power to a transmission frequency below a grid frequency; an insulated transmission cable (18) connected to the converter and disposed at least partly submarine or subterranean; and a synchronous frequency converter (24) remote from the wind turbine and configured to receive the AC electrical power from the insulated transmission cable (18) and to convert it to the grid frequency for supply to a grid.

20 Claims, 2 Drawing Sheets

(56) References Cited

OTHER PUBLICATIONS

Ning Lianhui et al; "Experiment on Wind Power Integration Grid via Fractional Frequency Transmission System: Realization of the Variable-frequency Power Wind"; Electric Utility Deregulation and Restructuring and Power Technologies (DRPT); 4th International Conference on IEEE 2011; ISBN: 978-1-4577-0384-5; DOI: 10.1109/DRPT,2011.5993932; XP032039169.

Xifan W. et al; "Experiment on Fractional Frequency Transmission System"; IEEE Transactions on Power Systems; vol. 21; No. 1; pp. 372-377; ISSN: 0885-8950; DOI: 10.1109/TPWRS.2005.860923; XP055142296.

Project Team of Georiga Institute of Technology and Iowa State University, Low Frequency Transmission, Oct. 2012, pp. 1-213, PSERC publication 12-28, Georiga Institute of Technology and Iowa State University.

\* cited by examiner

POWER GENERATION AND LOW FREQUENCY ALTERNATING CURRENT TRANSMISSION SYSTEM

FIELD OF THE INVENTION

The invention relates generally to power generation and transmission. In particular, the invention relates to generating alternating current electrical power via a remote wind turbine and transmitting the alternating current electrical power over extended distances using insulated cables.

BACKGROUND OF THE INVENTION

Power generation stations located remote from a load require transmission systems capable of efficiently transmitting the generated power from the power generation station to the load. Such systems include but are not limited to, for example, a remote wind turbine generator located in the sea, and a power grid located on land. Often a transmission cable of the transmission system must be located either submarine or subterranean in order to efficiently span a distance between the two. In addition, often the power generation station produces alternating current ("AC") electrical power, and often the load requires AC power. However, the transmission of AC power over long distances can be problematic.

In addition to resistive losses present in the transmission of both AC and direct current ("DC") electric power, the transmission of AC power generates reactive current resulting from a capacitance of the transmission cable and the cable consumes reactive losses from an inductance of the transmission cable. Increasing voltage and, in turn, decreasing current in AC power transmission can reduce resistive and reactive losses, which are proportional to a square of the current in the cable. However, capacitive charging current, which is a function of the voltage, frequency, cable geometry and insulation medium, may remain high, generally increasing with voltage.

The capacitance, C, per unit length of a transmission cable is determined by the geometry of the transmission cable and the dielectric constant(s) of the insulation surrounding the transmission cable. Charging the cable capacitance requires a capacitive charging current ("$i_{cc}$"). The capacitive charging current per phase may be given roughly by the equation:

$$i_{cc} = V_{line-neutral} * \omega * (L_{cable} * C_{cable})$$

where V is the line-neutral voltage, ω is the electrical frequency in radians per second (ω=2πf; 60 Hz=377 rad/s; 50 Hz=314 rad/s), L is the transmission cable length in kilometers, and C is a transmission cable capacitance in farads per km. It can be seen that for a given transmission cable, the conventional practice of increasing the voltage V in order to overcome resistive line losses and inductive losses generally has the effect of increasing the charging current $i_{cc}$, particularly in consideration of the increase in voltage and the fact that higher voltage generally necessitates thicker insulation, further increasing the capacitance.

It can be seen that for a given cable carrying a given electrical power, as the length L of the cable increases so does the charging current $i_{cc}$. Since a given transmission cable has a maximum current carrying capacity, any charging current $i_{cc}$ carried by the transmission cable to accommodate the capacitance of the cable directly reduces the amount of current the cable can deliver to the load. As a result of the charging current $i_{cc}$ of submarine and subterranean cables, conventional practice limits the transmission of AC electric power at frequencies of 50 Hz-60 Hz to distances of not more than approximately 50 km. At or below this length, the transmission cable is capable of delivering AC electric power with few operational constraints.

When transmission distances exceed 50 km, the AC electric power is conventionally converted into direct current ("DC") electric power. Transmission of DC electric power does not suffer from the reactive losses found in the transmission of AC electric power. However, in order to transmit DC power from a power generation station that produces AC power to a load that operates on AC power, generated AC power must be converted to DC power, and received DC power must be converted back to AC power for the load. Converting generated AC power into DC power requires an expensive AC to DC power transmission terminal to be installed at the power generation station (sending end), and an expensive DC to AC power transmission terminal to be installed at a receiving end, prior to the load. Additionally, there are few vendors of high voltage DC cable and submarine DC power transmission has unique operating and maintenance practices and specialized engineering, which can result in high cost of design, operation and maintenance. Consequently, there remains room in the art for improved power generation and transmission.

BRIEF DESCRIPTION OF THE DRAWINGS

The invention is explained in the following description in view of the drawings that show.

DETAILED DESCRIPTION OF THE INVENTION

Figure 1:
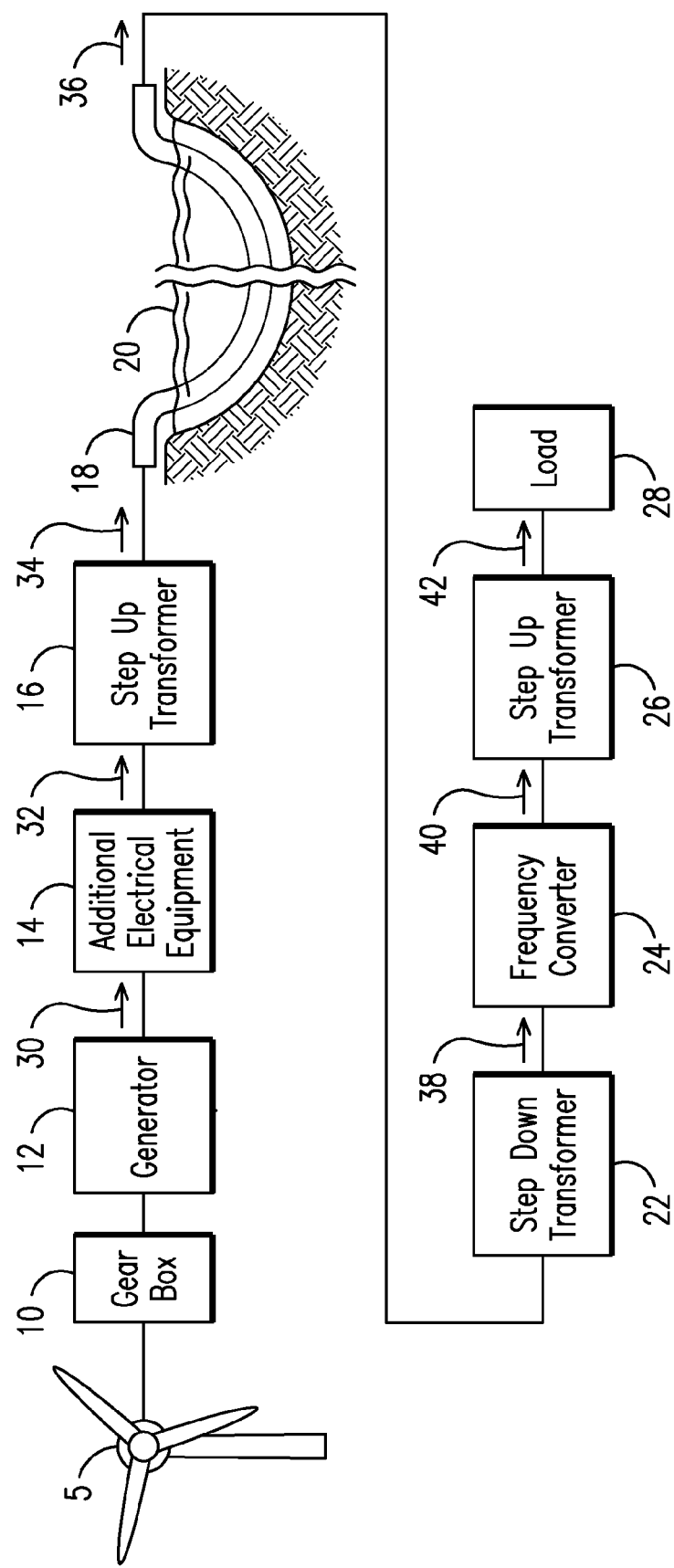
FIG. 1 is a schematic representation of a power generation and distribution system having a wind turbine.

The present inventor has recognized that some modern wind turbines include generators and/or power conditioning systems capable of delivering AC power at frequencies other than the grid frequency (typically 60 Hz in the US, or a frequency demanded by a load), and this ability may be used to condition wind turbine power in a manner that avoids the need for the DC power transmission terminals to effectively transmit the generated power.

A full converter wind turbine, for example, includes an electrical drivetrain where an airfoil driven shaft powers a generator that generates raw AC power. Intermediate electrical equipment, including a rectifier and an inverter, converts the raw AC power to intermediate DC power, and then converts the intermediate DC power into conditioned AC power acceptable for delivery to the load. Conventionally the load may be, for example, a power grid that demands input power be tightly controlled such that a frequency of a transmitted AC power must match a grid frequency to within a certain tolerance. Since wind turbines operate in varying wind conditions, and since varying wind conditions may cause the generator to produce raw AC power characterized by frequency variations outside acceptable limits for delivery to the grid, converting the raw AC power to intermediate DC power and back into conditioned AC power enables the turbine to produce conditioned AC power of acceptable quality despite varying wind conditions.

However, when transmission distances exceed the generally accepted limitation of about 50 km, where AC power reactive losses make the transmission of AC power at 50 Hz-60 hz untenable, conventional practice has been to convert the AC power into DC power for transmission using an AC-DC power transmission terminal, and then back into transmitted AC power acceptable for delivery to the load/grid using a DC-AC power transmission terminal at a receiving end.

The inventor has recognized this evolution but has also identified an improvement by bringing together two facts in a way the evolution has overlooked. First, the intermediate equipment in the full converter wind turbine is not limited to converting the intermediate DC power into conditioned AC power at 50 Hz or 60 Hz as is generally done in conventional full converter wind turbines. The intermediate equipment is fully capable, with minimal and/or simple modification, of converting the intermediate DC power into conditioned AC power at any frequency. Second, with respect to charging current $i_{cc}$, it can be seen from the equation:

$$i_{cc} = V_{line-neutral} * \omega * (L_{cable} * C_{cable})$$

that the charging current $i_{cc}$ is proportional to the electrical frequency of the electrical power the cable is carrying, and thus the charging current $i_{cc}$ can be reduced if the frequency of the electrical power is reduced. The inventor takes advantage of an interrelationship of the two above facts and proposes an innovative system where the expensive AC-DC power transmission terminal and DC-AC power transmission terminal can be dispensed with simply by generating and transmitting conditioned AC power with a frequency lower than 50 Hz-60 Hz. This advantageously results in power generation and transmission systems that are less expensive than conventional systems and that can transmit AC power over distances that are longer than previously achievable with reasonable efficiency.

As can be seen from the equation for charging current $i_{cc}$, reducing the frequency of the conditioned AC power from 60 Hz to 30 Hz, keeping other parameters constant, would reduce the charging current $i_{cc}$ by 50%. This would increase the effective transmission distance of a given transmission cable from 50 km to 100 km assuming that resistive losses were controlled to be non-limiting such as by selecting an appropriate voltage. Likewise, reducing the frequency of the conditioned AC power from 60 Hz to 20 Hz would reduce the charging current $i_{cc}$ by 67%, increasing the effective transmission distance of the given transmission cable from 50 km to 150 km. In a more extreme example, if the frequency of the conditioned AC power were reduced to 5 Hz, the limitation on effective transmission distance of the given transmission cable due to reactive losses could increase from 50 km to 600 km, and actual effective transmission distance would likely be limited by resistive losses rather than reactive losses. The parameters can be related as follows: when the transmission frequency equals the grid frequency divided by an integer "n", the transmission distance possible is at least 30*n kilometers.

As shown in FIG. 1, a power generation and distribution system in accordance with one embodiment of the invention may include a wind turbine 5 having a gear box 10, a generator 12, additional electrical equipment 14, a power-generation reduced-frequency step-up transformer 16, an insulated transmission cable 18 that is at least partly disposed under water 20 or subterranean, an optional receiving-end step-down transformer 22, a synchronous frequency converter 24, and an optional receiving-end step-up transformer 26.

In the case of a full converter turbine the additional electrical equipment 14 may include, in addition to circuit breakers etc, an AC-DC rectifier, a controlled DC bus, and a DC-AC inverter. The generator 12 generates raw AC electric power 30. In the case of a full converter wind turbine, the AC-DC rectifier produces the intermediate DC power. The DC-AC inverter produces conditioned AC power 32 at a reduced frequency (but not DC) for transmission through the transmission cable 18. A 30 Hz full converter of one embodiment of the invention may be larger the 50 or 60 Hz full converters conventionally provided with wind turbines; however, such a converter may be readily obtained.

The generator 12 may be an induction generator or a doubly fed induction generator, and the additional electrical equipment 14 may include circuit breakers and other miscellaneous equipment. In any case, the additional electrical equipment 14 delivers the conditioned lower-than-grid frequency AC electrical power 32 to the power-generation reduced-frequency step-up transformer 16 which may step up the voltage to, for example, 100-300 kV. A 30 Hz step-up transformer would also be larger than a conventional 50 or 60 Hz step-up transformer. However, both the converter and the step-up transformer are relatively simple and low cost components and installing or exchanging them is relatively straight forward.

The power-generation reduced-frequency step-up transformer 16 delivers stepped up and conditioned lower-than-grid frequency AC electrical power 34 for transmission via the transmission cable 18. The transmission cable 18 may be any insulated cable already available in the market, such as at least 100 kV rated voltage (line-line).

The optional receiving-end step-down transformer 22 receives the delivered low frequency AC electrical power 36 from the transmission cable 18 and steps down the voltage to, for example, 12-25 kV, to deliver stepped-down low-frequency AC electrical power 38 to the synchronous frequency converter 24. The synchronous frequency converter 24, which could readily and relatively inexpensively be placed above ground, converts the transmitted low-frequency AC electrical power into grid-frequency AC electrical power 40 suitable in frequency for delivery to the load or grid 28. An optional receiving-end step-up transformer 26 may step the voltage up to, for example, 769 kV or above for delivery of stepped up grid frequency AC electrical power 42 to the load or grid 28.

From the foregoing it can be seen in relevant part that the conventional system includes a 60 Hz interface converter, a 60 Hz transformer, and two DC terminals (one possibly on a floating platform), while the proposed system instead generates conditioned low frequency AC electrical power using additional electrical equipment 14 which may (or may not) include a reduced frequency interface converter, a reduced-frequency step-up transformer 16, and a synchronous frequency converter 24. Some proposed systems may further include the optional receiving-end step-down transformer 22 and optional receiving-end step-up transformer 26. The innovative system is simpler in design, and this simplicity represents a reduced cost of power generation and transmission when compared to conventional systems. In addition, the sum of the costs of the components of the proposed system is less than that of the conventional system.

If the grid frequency divided by the frequency of the delivered low-frequency AC electrical power 36 results in an integer, (i.e. if the grid frequency is an integer multiple of the reduced transmission frequency), an electromechanical synchronous frequency converter 24 could be used to invert the delivered low-frequency AC electrical power 36 into grid-frequency AC electrical power 42. It is known that electromechanical synchronous frequency converters may have higher losses that a DC terminal, but it is understood that the cost of the fuel (i.e. the wind power) is free, and the advantage of being able to locate a wind turbine farther from a load than is currently possible with prior art systems may outweigh the efficiency issue. The present invention expands the areas where wind turbines may be economically practical, since many areas with reliable wind supplies require more than 50 km of insulated cable to deliver power to a grid location.

For example, in the conventional system with two DC terminals, each DC terminal may cost $100 per kVA which, in a 200 MVA system may total upwards of $20,000,000 each, for a total cost of $40,000,000. In the proposed system, only one synchronous frequency converter is required, and those are significantly less expensive. For example, a synchronous frequency converter may cost $10 per kVA which, in a 200 MVA system would cost approximately $2,000,000. This represents a significant savings over conventional systems. In addition, depending on the depth of the sea floor, DC terminals of conventional systems may need to be installed on a floating platform, which adds to the cost. This may occur if the sea bed is, for example, over 50 m from the surface. In contrast, the off-shore equipment of the present invention could be accommodated in existing wind turbine nacelle and tower spaces.

The inventive transmission system could also be used with wind turbine power generation systems that use induction generators, including double fed induction generators, simply by adapting the frequency of the electricity output from the generators. Presently, in doubly fed induction generators, gearboxes are used to increase the shaft rotational speed. These gearboxes greatly increase the speed, sometimes by two orders of magnitude, and are complex and costly. By putting out a lower frequency, a simpler gearbox could be used.

Figure 2:
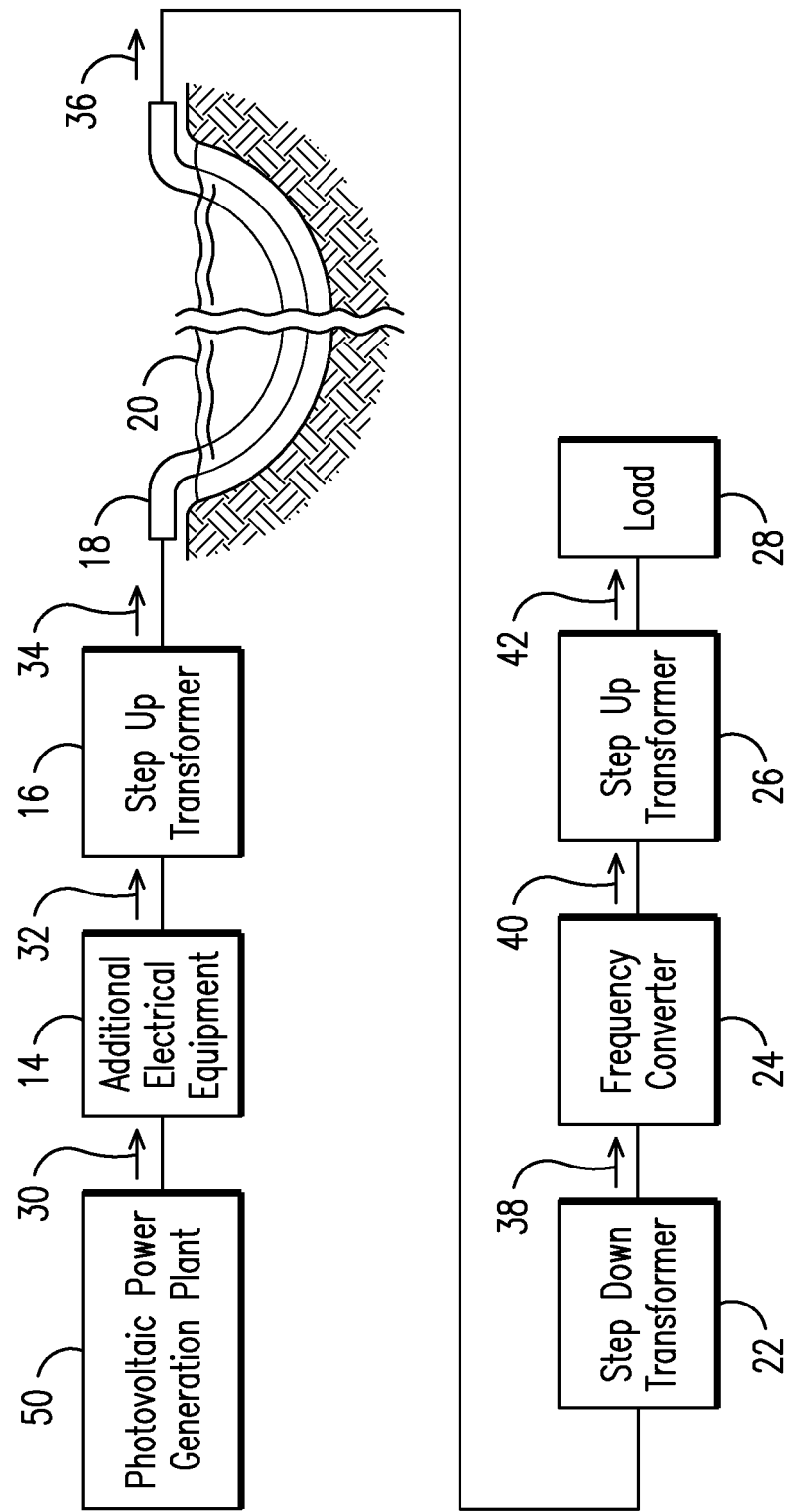
FIG. 2 is a schematic representation of a power generation and distribution system having a photovoltaic power plant.

Further, the transmission system is not limited to wind turbines, but could be used in conjunction with solar power etc. Photovoltaic power generation plants, for example, share many similarities with full converter wind turbines and could also put out reduced frequency outputs via their output converters. FIG. 2 is a schematic representation of the power generation and transmission system of FIG. 1, but instead of a wind turbine 5, a photovoltaic power generation plant 50 is used. Similar to the system of FIG. 1, the system of FIG. 2 also includes elements with like reference numerals used to designate similar or equivalent elements.

Regardless of which power generation system is used, so long as the frequency of conditioned power can be selected as described, the concepts disclosed herein may be applied to any power distribution system.

From the foregoing it is evident that the proposed system generates and transmits AC power via an insulated cable for farther distances than conventional systems, and does so with less expensive components. Consequently, the inventive system represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A power generation and transmission system comprising:
    a wind turbine comprising an electrical generator producing alternating current (AC) electrical power at a production frequency;
    a first synchronous frequency converter electrically connected to the electrical generator and configured to convert the AC electrical power to AC electrical power characterized by a transmission frequency that is less than a grid frequency;
    an insulated transmission cable configured to receive the AC electrical power at the transmission frequency from the first frequency converter, the transmission cable disposed at least partly submarine or subterranean; and
    a second synchronous frequency converter remote from the wind turbine and configured to receive the AC electrical power at the transmission frequency from the insulated transmission cable and to convert it to the grid frequency for supply to a grid configured to distribute AC electrical power at the grid frequency.

2. The system of claim 1, wherein the insulated transmission cable spans greater than 50 km.

3. The system of claim 1, wherein the wind turbine and first frequency converter comprise a full converter system.

4. The system of claim 1, wherein the electrical generator comprises an induction generator.

5. The system of claim 4, wherein the electrical generator comprises a doubly fed induction generator.

6. The system of claim 1, wherein the transmission frequency equals the grid frequency divided by an integer "n" and the transmission distance is in excess of (30*n) km.

7. The system of claim 1, wherein the insulated transmission cable comprises at least 100 kV rated voltage (line-line).

8. The system of claim 1, further comprising a step down transformer between the insulated transmission cable and the second frequency converter, the step down transformer configured to receive the AC electrical power at the transmission frequency and to produce AC electrical power.

9. A method of power generation and transmission comprising:
    generating alternating current (AC) power using a power generation system;
    transmitting the AC power away from the power generation system at a transmission frequency that is below a grid frequency of a power grid via an insulated transmission cable at least partly disposed submarine or subterranean;
    receiving the AC power from the transmission cable at the transmission frequency at a location remote by a transmission distance from the power generation system;
    upconverting the AC power from the transmission frequency to the grid frequency; and
    delivering the AC power to the power grid at the grid frequency.

10. The method of claim 9, wherein the transmission frequency equals the grid frequency divided by an integer "n" and the transmission distance is in excess of (30*n) km.

11. The method of claim 9, further comprising generating the AC power using a wind turbine.

12. The method of claim 9, further comprising generating the AC power using an induction generator.

13. The method of claim 9, further comprising generating the AC power using a full converter wind turbine.

14. The method of claim 9, further comprising generating the AC power using a photovoltaic power park.

15. The method of claim 9, upconverting the transmission frequency of the AC power to the grid frequency using a synchronous frequency converter.

16. The method of claim 9, further comprising stepping down a voltage of the AC power received from the transmission cable prior to upconverting the AC power from the transmission frequency to the grid frequency.

17. The method of claim 9, further comprising generating the AC power in the transmission cable to have a voltage of at least 100 kV.

18. A power generation and transmission system comprising:

a power generation system producing alternating current (AC) electrical power at a production frequency, the power generation system comprising an AC to DC rectifier, and a DC to AC inverter;

a first frequency converter electrically connected to the power generation system and configured to convert the AC electrical power to AC electrical power characterized by a transmission frequency that is below a grid frequency;

an insulated transmission cable configured to receive the AC electrical power at the transmission frequency from the first frequency converter, the transmission cable disposed at least partly submarine or subterranean; and a second frequency converter remote from the power generation system and configured to receive the AC electrical power at the transmission frequency from the insulated transmission cable and to convert it to the grid frequency for supply to a grid configured to distribute AC electrical power at the grid frequency.

19. The system of claim 18, wherein the power generation system comprises a wind turbine comprising an electrical generator.

20. The system of claim 18, wherein the power generation system comprises a photovoltaic power park.

* * * * *